United States Patent Office 3,641,194
Patented Feb. 8, 1972

3,641,194
THERMOCURABLE POLYESTER-DIEPOXIDE
COMPOSITIONS
Rolf Schmid, Reinach, Basel-Land, Ingrid Bucher, Basel,
Willy Fisch, Binningen, and Hans Batzer, Arlesheim,
Switzerland, assignors to Ciba Limited, Basel, Switzerland
No Drawing. Filed Feb. 4, 1969, Ser. No. 796,583
Claims priority, application Switzerland, Feb. 19, 1968,
2,361/68
Int. Cl. C08g 30/12, 45/14
U.S. Cl. 260—835          6 Claims

ABSTRACT OF THE DISCLOSURE

Crystalline polymers are prepared by the formation of adducts from diepoxides, preferably diglycidyl ethers of diphenols, such as bisphenol A and acid polyesters of succinic acid and 1,4-butanediol (the recurrent structural unit of the formula —O—$(CH_2)_4$—OCO$(CH_2)_2$—CO— must occur at least six times in the chain). The ratio of epoxide groups of the diepoxide to carboxyl groups of the polyester is 1:0.7 to 1.2, preferably about 1:1. Advantageously, a portion of the dicarboxylic anhydrides (for example a dodecenylsuccinic anhydride) is concomitantly used as chain cross-linking agent. Of advantage is for example an equivalent ratio of 1.3 epoxide group: 1.0 carboxyl group +0.2 anhydride group. After stretching, the polymers have a tensile strength of 700–1000 kg./cm.$^2$ and an elongation at break of 50–150%. Above the crystallization transition temperature, they are rubber-elastic. They are used, for example, as potting and sealing compounds or for the manufacture of fibers, ribbons, foils.

It is known that cross-linked polymer products of high flexibility can be obtained by polyaddition of polybasic aliphatic carboxylic acids to polyepoxides, for example polyglycidyl ethers of diomethane. Here the rule applies that the flexibility of the products increases the higher is the proportion of aliphatic chains. The products however become significantly softer and finally only show very low mechanical strengths with moderate elongation at break.

It has now been found that crystalline products which, especially after stretching at elevated temperature, show extraordinarily high mechanical strength and good flexibility and extensibility are obtained by polyaddition of acid polyesters from succinic acid or succinic anhydride and 1,4-butanediol to diepoxides. The polymers show a surprisingly high crystal transition temperature (CTT) of above 100° C. and a relatively high heat stability, compared to other polymers from the homologous series. In contrast to crystalline thermoplastic polymers the polymers according to the invention behave in a rubber-elastic manner above the CTT and as a result of this feature show good resistance to creep.

The acid polyester from succinic acid and 1,4-butanediol used for the polyaddition must be of relatively long chain length, that is to say the recurring structural unit of formula

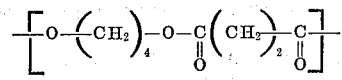

must occur at least six times in the chain. The stoichiometric ratio of the reagents must furthermore be so chosen that 0.7 to 1.2 equivalents of carboxyl groups of the dicarboxylic acid are employed per 1 equivalent of epoxide groups of the diglycidyl compound.

The subject of the present invention is thus a process for the manufacture of crystalline polyadducts characterised in that linear polyesters having terminal carboxyl groups, of average formula

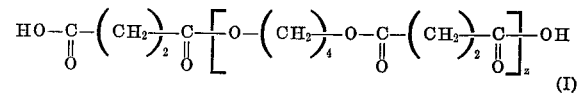

wherein z denotes a number having a value of at least 6, preferably a value of 7 to 30, are reacted with diepoxide compounds with warming to form polyadducts, and in particular preferably reacted with such diepoxide compounds as have an epoxide equivalent weight of not greater than 500, with 0.7 to 1.2, preferably 0.9 to 1.0, equivalents of carboxyl groups being employed per 1 equivalent of epoxide groups. The manufacture of the succinic acid-butane-1,4-diol polyester possessing carboxyl end groups takes place in accordance with the following equation:

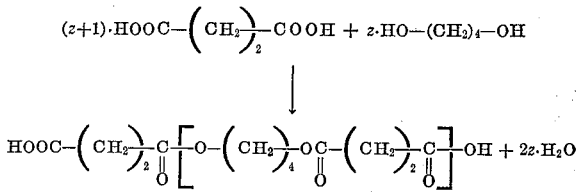

Instead of succinic acid, succinic anhydride can also be employed in accordance with the following equation

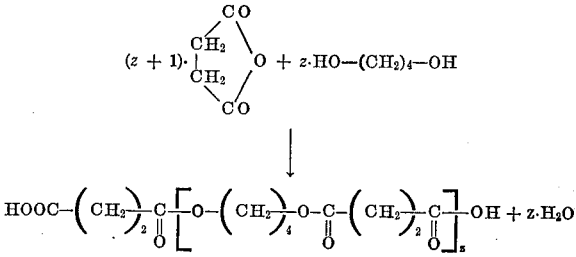

To carry out the manufacture, the starting substances are mixed and heated by the melt process under nitrogen to 150–160° C. until the calculated carboxyl equivalent weight is reached.

The succinic acid-butane-1,4-diol polyesters of Formula I have an average molecular weight of at least about 1150 and preferably of about 1300 to about 5300. The commercial products still contain small proportions of polyesters having both terminal carboxyl and terminal hydroxyl groups.

It is also possible for a small proportion of another dicarboxylic acid such as for example glutaric acid or adipic acid and/or of another diol such as for example propanediol or hexanediol to be condensed into the polyesters, but the technical properties of the crystalline polymer products are as a rule worsened by such a modification, or their crystal transition point is lowered.

As diepoxide compounds, diglycidyl ethers or diglycidyl esters of formula

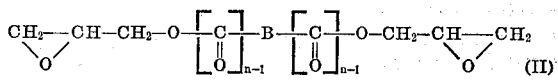

wherein B denotes a bivalent aliphatic, cycloaliphatic, araliphatic or aromatic residue and $n$ denotes the number 1 or 2 are here especially used.

The dicarboxylic acids (I) and diglycidyl ethers or diglycidyl esters of Formula II used as the starting substances are advantageously added in as pure a form as possible.

The diglycidyl ethers or diglycidyl esters of Formula II should not contain more than 20 mol percent, preferably not more than 10 mol percent, of impurities or admixtures; otherwise, the formation of polyadducts which do not possess the desired structural properties at room temperature takes place as a result of premature chain stoppage.

The polyaddition reaction is preferably carried out in the presence of an accelerator. Suitable accelerators are basic compounds, for example alkali or alkaline earth alcoholates, and especially tertiary amines and their salts such as benzyldimethylamine or triamylammonium phenolate. Certain metal salts of organic acids such as for example tin octoate or bismuth salicylate are furthermore suitable as accelerators. As a rule the process is here carried out within the temperature range of 100 to 200° C., preferably 120 to 170° C. On adding 1% by weight of accelerator (for example 2-ethyl-4-methylimidazole or triamylammonium phenolate from 70.7 parts of triamylamine and 29.3 parts of phenol) cure in most cases takes place at 120 to 140° C. within 16 hours. The cure can however be greatly accelerated by adding the 3-fold to 10-fold quantity of accelerator or be carried out at lower temperatures without worsening the mechanical properties. The crystallisation transition temperature (CTT) is hereby frequently raised by a few more degrees.

Shaped articles made from the crystalline polymer products manufactured according to the invention as a rule only show high strength values of 700 to above 1000 kg./cm.$^2$, with an elongation at break of 50 to 150%, after being stretched (orientation of the micro-crystalline regions). Above the crystallisation transition temperatures the shaped articles behave in a rubber-elastic manner and have an elongation at break of at least 100%.

The polyaddition is advantageously carried out in the presence of a dicarboxylic acid anhydride and an appropriate additional amount of diepoxide. This results in a higher degree of cross-linking and thus in greater hardness and resilience in the rubber-elastic state. Up to a certain percentage addition the mechanical strength in the crystalline state is also increased. For this purpose there are added, per 1 equivalent of carboxyl groups of the linear acid polyester (a), 0.05 to 0.4, preferably 0.1 to 0.3, mol of a dicarboxylic acid anhydride as well as a corresponding addition of 0.05 to 0.4, preferably 0.1 to 0.3, epoxide group equivalent of the diepoxide compound (b) over and above the amount required for the reaction with the linear acid polyester (a). The use of more than 40 mol percent of cross-linking agent should be avoided as a rule since this in general leads to cured specimens of lower strength values as a result of the great increase in the density of cross-linking. Cross-linking can of course also be achieved by replacing a part of the diepoxide compound by a triepoxide compound. Polymers cross-linked in this way however do not attain the high strength values of the polymers cross-linked with anhydride, since hydroxyl end groups which may be present

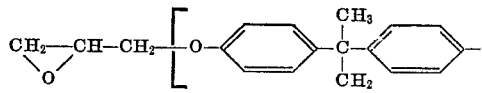

are converted by the anhydride into ester-carboxylic acids and thus also participate in the synthesis of the chain.

Possible diepoxides which are reacted with the polyesterdicarboxylic acids of Formula I in the process according to the invention are especially those having not too high a molecular weight and in particular as a rule diepoxides having an epoxide equivalent weight of not more than 500. Diepoxides of relatively low molecular weight, especially those having an epoxide equivalent weight of above 100 to 250, are in general particularly suitable for the manufacture of crystalline products.

Suitable diepoxides are for example alicyclic diepoxides such as vinylcyclohexene dioxide,
limonene dioxide,
dicyclopentadiene diepoxide,
bis(2,3-epoxycyclopentyl)-ether,
bis-3,4-(epoxycyclohexylmethyl)adipate, (3',4'-epoxycyclohexylmethyl)-3,4-epoxy-cyclohexane-carboxylate,
3',4'-epoxy-6'-methyl-cyclohexylmethyl-3,4-epoxy-6-methylcyclohexanecarboxylate;
3-(3',4'-epoxycyclohexyl)-2,4-dioxaspiro-5,5)-8,9-epoxy-undecane,
3-(glycidyloxyethoxyethyl)-2,4-dioxaspiro(5,5)-8,9-epoxy-undecane, and
3,9-bis-(3',4'-epoxycyclohexyl)spirobi(meta-dioxane).

Further possibilities are basic polyepoxide compounds such as are obtained by reaction of primary aromatic monoamines such as aniline, or toluidine or of secondary aromatic diamines such as 4,4' - di-(methylamino)-diphenylmethane with epichlorhydrin in the presence of alkali.

Diglycidyl ethers or diglycidyl esters are preferably used. Possible diglycidyl esters which can be reacted with the linear, acid polyesters of Formula I in the process according to the invention are especially those which are accessible by reaction of a dicarboxylic acid with epichlorhydrin or dichlorhydrin in the presence of alkali. Such diesters can be derived from aliphatic dicarboxylic acids such as succinic acid, adipic acid or sebacic acid, from aromatic dicarboxylic acids such as phthalic acid, isophathalic acid or terephthalic acid, or especially from hydroaromatic dicarboxylic acids such as $\Delta^4$-tetrahydrophthalic anhydride, hexahydrophthalic anhydride or 4-methylhexahydrophthalic anhydride. Diglycidyl phthalate, diglycidyl terephthalate, diglycidyl $\Delta^4$-tetrahydrophthalate and diglycidyl hexahydrophthalate may for example be mentioned.

As diglycidyl ethers which can be reacted with the dicarboxylic acids of Formula I in the process according to the invention, those which are accessible by etherification of a dihydric alcohol or diphenol with epichlorhydrin or dichlorhydrin in the presence of alkali are especially used. These compounds can be derived from glycols such as ethylene glycol, diethylene glycol, triethylene glycol, 1,3-propylene glycol, 1,4-butanediol, 1,5-pentanediol, and 1,6-hexanediol; cycloaliphatic dialcohols such as quinitol or 2,2 - bis(4' - hydroxycyclohexyl)propane; nitrogen-containing dialcohols such as N-phenyl-diethanolamine; and especially from diphenols such as resorcinol, pyrocatechol, hydroquinone, 1,4-dihydroxynaphthalene, bis(p-hydroxyphenyl) - methane, bis-(p-hydroxyphenyl)-methylphenylmethane, bis-(p-hydroxyphenyl)-tolylmethane, 4,4'-dihydroxy-diphenyl, bis-(p-hydroxyphenyl)-sulphone, 2,2-bis-(4'-hydroxy-3',5'-dibromophenyl)propane or preferably 2,2-bis-(p-hydroxyphenyl)-propane.

The diglycidyl ethers which are derived from 2,2-bis-(p-hydroxyphenyl)propane (=diomethane) and which correspond to the average formula

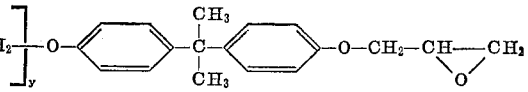

wherein y denotes an integral or fractional small number, for example having a value of 0 to 2, may be especially mentioned.

It is of course also possible to use mixtures of two or more of the above-mentioned diepoxides.

As an optionally additionally used cross-linking agent it is for example possible to use a triepoxide compound such as triglycidyl isocyanurate or N,N',N''-tri($\beta$-glycidyloxypropionyl)-hexahydro-s-triazine or a tricarboxylic acid such as tricarballylic acid.

However, polycarboxylic acid anhydrides and in particular dicarboxylic acid anhydrides are preferentially considered as cross-linking agents. There may for example be mentioned phthalic anhydride,
$\Delta^4$-tetrahydrophthalic anhydride,
hexahydrophthalic anhydride,
4-methylhexahydrophthalic anhydride, 3,6-endomethylene-Δ⁴-tetrahydrophthalic anhydride,
methyl - 3,6 - endomethylene-Δ⁴-tetrahydrophthalic anhydride (=methylnadicanhydride),
3,4,5,6,7,7-hexachlor-3,6-endomethylenetetra-hydrophthalic anhydride,
succinic anhydride,
adipic anhydride,
azelaic anhydride, sebacic anhydride,
maleic anhydride,
allylsuccinic anhydride or
dodecenylsuccinic anhydride;
7 - allyl - bicyclo(2,2,1) - hept-5-ene-2,3-dicarboxylic acid anhydride,
pyromellitic acid dianhydride or mixtures of such anhydrides.

The manufacture of crystalline polymer products according to the invention as a rule takes place with simultaneous shaping to give castings, foamed articles, moulding, lacquer films, laminates, adhesive bonds and the like. Here the procedure is to manufacture a mixture of the linear acid polyester (a) of Formula I and the diepoxide or preferably the diglycidyl ether or diglycidyl ester of Formula II as well as the optionally conjointly used basic catalyst and/or cross-linking agent (for example dicarboxylic acid anhydride) and that this mixture is then, after introducing it into casting or compression moulds, spreading it as coatings, introducing it into adhesive joints etc. allowed to react with application of heat to give the polymer.

A subject of the present invention is therefore also the curable compositions which can, under the influence of heat, be converted to shaped articles including predominantly two-dimensional structures such as coatings or adhesive bonds which contain (a) a linear, acid polyester of Formula I and (b) a diepoxide or preferably a diglycidyl ether or diglycidyl ester of Formula II as well as optionally furthermore a basic cure accelerator and/or an additional cross-linking agent such as especially a dicarboxylic acid anhydride. Herein 0.7 to 1.2 equivalents of carboxyl groups are present per 1 equivalent of epoxide groups provided no additional cross-linking agent is present. When using a dicarboxylic acid anhydride as the cross-linking agent the latter is as a rule present in an amount of 0.05 to at most 0.4 mol per 1 equivalent of carboxyl groups of the linear acid polyester (a), and in this case the mixture should furthermore contain an excess of 0.05 to 0.4 epoxide group equivalent of the diepoxide compound (b) over and above the amount required for the reaction with the linear acid polyester (a).

The diepoxide, linear acid polyester and possible additives can easily be mixed at an elevated temperature to give a melt of low to medium viscosity having a relatively long use time or "pot life." A particular advantage of the new moulding compositions resides in the low evolution of heat and in the slight shrinkage on conversion to the crystalline polymer. The shrinkage is particularly low after gelling has taken place. As a result of this property it is possible to cast even large articles rapidly and to cure them without significant strains.

The curable compositions can naturally have further usual additives such as filters, reinforcing agents, mould release agents, anti-ageing agents, flame-inhibiting substances, dyestuffs or pigments added to them.

Suitable fillers or reinforcing agents are fibrous or pulverulent inorganic as well as organic substances. Quartz powder, hydrated aluminium oxide, mica, aluminium powder, iron powder, iron oxide, ground dolomite, chalk powder, gypsum, slate powder, unburned kaolin (bolus), burnt kaolin, glass fibres, boron fibres, carbon fibres and asbestos fibres may be mentioned.

The curable compositions can furthermore, in the unfilled or filled state, serve as dipping resins, casting resins, impregnating resins, flooring compositions, sealing compositions, potting and insulating compositions for electrotechnology, and adhesives, as well as for the manufacture of such products.

The use of the curable compositions according to the invention for the manufacturer of fibres, strips and foils is of particular interest.

In the examples which follow the percentages, unless otherwise stated, denote percentages by weight. The following acid polyesters were used for the manfacture of crystalline polymers described in the examples:

POLYESTER A 130 g. of succinic acid were warmed to 175° C. for 3½ hours with 90 g. of butanediol-1,4 (molar ratio 11:10) under a nitrogen atmosphere whilst stirring. The resulting water distills off continuously. The last traces of moisture were removed over the course of 3 hours in vacuo (16 mm. Hg.) at 205° C. The resulting acid polyester had an acid equivalent weight of 925 (theory 925).

POLYESTER B 350 g. of succinic acid and 244 g. of butanediol-1,4 (molar ratio 11:10) were warmed to 220° C. over the course of 5½ hours under a nitrogen atmosphere, whilst stirring. The water formed by the esterification reaction was distilled off continuously. The last traces of moisture were removed in vacuo (13 mm. Hg) at 210° C. over the course of 1½ hours. The resulting acid polyester A had an acid equivalent weight of 1340 (theory 924).

POLYESTER C 124 g. of succinic acid were warmed to 215° C. with 90 g. of butanediol-1,4 (molar ratio 21:20) over the course of 3½ hours under a nitrogen atmosphere whilst stirring. The resulting water of reaction distilled off continuously. The last traces of moisture were removed over the course of 3 hours in vacuo (16 mm. Hg) at 215° C. The resulting acid polyester had an acid equivalent weight of 1500 (theory 1739).

POLYESTER D 366 g. of succinic acid were reacted with 270 g. of butanediol-1,4 (molar ratio 31.30) under a nitrogen atmosphere. The reaction mixture was warmed for 5½ hours to 220° C. whilst stirring, in the course of which the resulting water of reaction distilled off continuously. The last remnants of moisture were removed in vacuo (10 mm. Hg) at 215° C. over the course of 2½ hours. The acid polyester thus manufactured had an acid equivalent weight of 1985 (theory 2640).

POLYESTER E 400 g. of succinic anhydride were warmed to 150° C. with 309 g. of butanediol-1,4 (molar ratio 7:6 under a nitrogen atmosphere and whilst stirring. The temperature of the reaction mixture rose to 190° C. without further external application of heat. After cooling to 155° C. the mixture was warmed to 190° C. over the course of 4 hours and the resulting water of reaction was continuously distilled off. In order to complete the polycondensation reaction the mixture was cooled to 110° C. and again warmed to 190° C. over the course of 1 hour under a vacuum of 14 mm. Hg. A white crystalline polyester having an acid eqivalent weight of 560 (theory=548) was obtained. The melting point, measured by means of the differential calorimeter, was about 105° C.; a second, weaker, maximum in energy absorption was observed at 94° C.

MANUFACTURE OF SHAPED ARTICLES

Example 1

925 g. of polyester A were warmed with 240 g. of a bisphenol-A diglycidyl ether manufactured by condensation of epichlorhydrin with 2,2-bis(p-hydroxylphenyl)-propane (=diomethane) in the presence of alkali, which was liquid at room temperature and had an epoxide content of 5.35 epoxide equivalents/kg. (=epoxide=resin (I)), and with 53.2 g. of dodecenylsuccinic anhydride (corresponding to a ratio of 1.0:1.3:0.2 equivalents) as well as 2.4 g. of 2-ethyl-4-methylimidazole, well mixed, and after a short vacuum treatment to remove the air bubbles cast into pre-warmed aluminium moulds of internal dimensions 150 x 150 x 1 mm. After a heat treatment of 16 hours at 140° C. test specimens according to ISO draft recommendation 468 (test specimen No. 1) were punched out. The punched-out test specimens were warmed to 140° C. and stretched to about 400% whilst cooling slowly. The following properties were measured on the stretched test specimens:

Tensile strength according to ISO/468—790 kp./cm.$^2$
Elongation at break according to ISO/468—50%
Crystallisation transition temperature:
  stretched—102° C.
  unstretched—98° C.

PROOF OF CRYSTALLINITY

The crystallisation transition temperatures were measured by means of the differential calorimeter. On warming a resin at a uniform speed a strong energy absorption by the resin takes place within a relatively small temperature range as the crystals melt. The temperature at which the energy absorption is greatest is described as the crystallisation transition temperature (CTT). In the method used, the energy was measured directly and not determined via a temperature difference with a comparison sample.

Example 2

40 g. of polyester A were well mixed at 100 C. with 8.8 g. of a $\Delta^4$-tetrahydrophthalic acid diglycidyl ester having an epoxide content of 6.4 epoxide equivalents/kg. (=epoxide resin II) and 1.33 g. of hexahydrophthalic anhydride (corresponding to a ratio of 1.3:1.0:0.2 equivalents) as well as 0.2 g. of 2-ethyl-4-methyl-imidazole and after a short vacuum treatment to remove the air bubbles the mixture was cast into prewarmed aluminium moulds for 4 mm. thick tensile specimen according to DIN 16946. After a heat treatment lasting 16 hours at 140° C. the tensile specimen were warmed to 110° C. and carefully stretched to an approximately 3-fold elongation whilst cooling slowly. The following results were measured on the stretched test specimens:

Tensile strength according to DIN 53,455—560 kp./cm.$^2$
Elongation at break according to DIN 53,455—104%
Crystallisation transition temperature—97° C.

Comparison Experiment 472 g. of succinic acid and 270 g. of butanediol-1,4 (molar ratio 4:3) were heated to 180° C. in a stream of nitrogen. Condensation was carried out for 5 hours with constant stirring, in the course of which the resulting water distilled off continuously. Thereafter the last traces of moisture were removed in vacuo (20—10 mm. Hg) over the course of 4 hours at 140–150° C. The resulting acid polyester had an acid equivalent weight of 320 (theory:344).

The polyester was cast together with epoxide resin (I) and hexahydrophthalic anhydride in the equivalent ratio of 1.0:1.3:0.2 and cured for 15 hours at 150° C. (accelerator:2-ethyl-4-methyl-imidazole). The casting gels but is not crystalline.

Example 3

(a) 24.0 g. of epoxide resin (I) according to Example 1 were well mixed with 134 g. of polyester B and with 5.32 g. of dodecenylsuccinic anhydride (corresponding to a ratio of 1.3:1.0:0.2 equivalents) and with 0.24 g. of 2-ethyl-4-methyl-imidazole at 100° C. and cast into the moulds (1 mm. thick sheets according to those of Example 1 as well as 4 mm. thick tensile specimen according to DIN 16,946) after a short vacuum treatment. After a heat treatment lasting 16 hours at 140° C. test specimens according to ISO 468 were punched out of the 1 mm. sheet and were stretched whilst warm, whilst the DIN test specimen were tested without prior stretching. The following measured values were obtained:

Tensile strength according to DIN at 20° C.—234 kp./cm.$^2$
Elongation at break according to DIN—300%
Tensile strength according to DIN at 55° C.—150 kp./cm.$^2$
Elongation at break according to DIN—420%
Tensile strength according to DIN at 85° C.—80 kp./cm.$^2$
Elongation at break according to DIN—530%
Tensile strength according to ISO after prior stretching—1000 kp./cm.$^2$
Elongation at break according to ISO after prior stretching—50%
Crystallisation transition temperature in the unstretched state—104° C.
Crystallisation transition temperature in the stretched state—104° C.

(b) On using 0.4 equivalent of dodecenylsuccinic anhydride and 1.5 equivalents of epoxide resin (I) and otherwise the same composition and processing as in Example 3a, the following measured values were obtained on the test specimens:

Tensile strength according to ISO—673 kp./cm.$^2$
Elongation at break according to ISO—50%
Crystallisation transition temperature—100° C.

Example 4

24.0 g. of epoxide resin (I) according to Example 1 were well mixed at 100° C. with 150 g. of polyester C and 5.32 g. of dodecenylsuccinic anhydride (corresponding to a ratio of 1.3:1.0:0.2 equivalents) as well as 0.24 g. of 2-ethyl-4-methylimidazole, and the mixture was cast into the moulds corresponding to Example 2. After a heat treatment lasting 16 hours at 140° C. and the same pre-treatment as in Example 2, the following properties were measured on the test specimens:

Tensile strength according to DIN (unstretched)—210 kp./cm.$^2$
Elongation at break according to DIN (unstretched)—155%
Tensile strength according to ISO (after stretching)—970 kp./cm.$^2$
Elongation at break according to ISO (after stretching)—64%
Crystallisation transition temperature (unstretched)—104° C.

Example 5

(a) 198.5 g. of polyester D were warmed to 100° C. with 24.0 g. of epoxide resin (I) according to Example 1 and 5.32 g. of dodecenylsuccinic anhydride (corresponding to a ratio of 1.3:1.0:0.2 equivalents) and were well mixed with 0.24 g. of 2-ethyl-4-methyl-imidazole. After a short vacuum treatment the mixture was cast into the moulds according to Examples 1 and 2 and subjected to a heat treatment lasting 16 hours at 140° C. As in Example 3, the 1 mm. thick ISO test specimen were stretched whilst warm, whilst the DIN test specimen were tested without further pre-treatment. The following measured values were obtained:

Tensile strength according to DIN (unstretched)—250 kp./cm.$^2$
Elongation at break according to DIN (unstretched)—118%
Crystallisation transition temperature (unstretched)—107° C.
Tensile strength (ISO test specimens, stretched)—510 kp./cm.$^2$ Elongation at break (ISO test specimens, stretched)—
140%

(b) On using 0.2 equivalent of hexahydrophthalic anhydride instead of 0.2 equivalent of dodecenylsuccinic anhydride and otherwise the same composition and processing as in Example 5a the following properties were measured on the test specimens:

Tensile strength (ISO test specimens, stretched)—
800 kp./cm.$^2$

Elongation at break (ISO test specimens, stretched)—
118%

Crystallisation transition temperature (unstretched)—
107° C.

(c) On using 1.3 equivalents of epoxide resin (II) instead of 1.3 equivalents of epoxide resin (I) and otherwise the same composition and processing as in Example 5a, the following properties were measured on the test specimens:

Tensile strength (ISO test specimens, stretched)—740 kp./cm.$^2$

Elongation at break (ISO test specimens, stretched)—
24%

Crystallisation transition temperature (unstretched)—
110° C.

Example 6

202 g. of epoxide resin II ($\Delta^4$-tetrahydrophthalic acid diglycidyl ester) according to Example 2 (=1.3 equivalents) were warmed to 120° C. with 560 g. of polyester E (=1.0 equivalent) and 30.8 g. of hexahydrophthalic anhydride and were mixed homogeneously. Thereafter 0.4 g. of 1-methylimidazole was further admixed as an accelerator. The mixture was briefly subjected to a vacuum and cast into the pre-warmed moulds corresponding to Example 1. After a heat treatment lasting 16 hours at 140° C. crystalline, highly flexible moulded materials having the following properties were obtained:

Tensile strength according to ISO (unstretched)—200 kg./cm.$^2$.

Elongation at break according to ISO (unstretched)—
290%

Tensile strength according to ISO (stretched up to 210% at room temperature—400 kg./cm.$^2$ Elongation at break according to ISO (stretched)—83%

Crystallisation transition temperature—81° C.

We claim:
1. A thermocurable composition of matter which comprises (a) a linear polyester having terminal carboxyl groups, of average formula

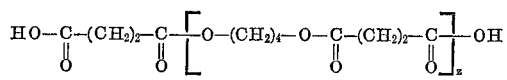

wherein $z$ denotes an integer having a value of at least 6, (b) a diepoxide, having an epoxide equivalent weight of not more than 500, with the proviso that 0.7 to 1.2 equivalents carboxyl groups of polyester (a) must be present per 1 equivalent epoxide groups of diepoxide (b), (c) a dicarboxylic acid anhydride as a cross-linking agent, with the proviso that there must be present, per equivalent of carboxyl groups of the linear acid polyester (a), 0.05 to 0.4 mol of the dicarboxylic acid anhydride as well as an excess of 0.05 to 0.4 epoxide group equivalent of the diepoxide (b) above the amount required for the reaction with the linear acid polyester (a), and (d) a basic accelerator.

2. A compositions as claimed in claim 1 which contains a linear acid polyesters (a) in which the symbol $z$ in formula (I) denotes a number having a value of 7 to 30.

3. A composition as claimed in claim 1 which contains a diepoxide (b) having an epoxide equivalent weight of 100 to 250.

4. A composition as claimed in claim 1 which contains a tertiary amine as the basic accelerator.

5. A thermocurable composition of matter of claim 1 wherein there is present from 0.9 to 1.0 equivalents of carboxyl groups of polyester (a), per 1 equivalent epoxide groups of diepoxide (b).

6. A thermocurable composition of matter which comprises (a) a linear polyester having terminal carboxyl groups, of average formula

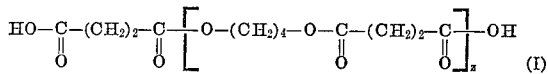

wherein $z$ denotes an integer having a value of at least 6, (b) a diepoxide, having an epoxide equivalent weight of not more than 500, with the proviso that 0.7 to 1.2 equivalents carboxyl groups of polyester (a) must be present per 1 equivalent epoxide groups of diepoxide (b), (c) a dicarboxylic acid anhydride as a cross-linking agent, with the proviso that there must be present, per equivalent of carboxyl groups of the linear acid polyester (a), 0.1 to 0.3 mol of the dicarboxylic acid anhydride as well as an excess of 0.1 to 0.3 epoxide group equivalent of the diepoxide (b) above the amount required for the reaction with the linear acid polyester (a), and (d) a basic accelerator.

References Cited

UNITED STATES PATENTS

| | | | |
|---|---|---|---|
| 2,683,131 | 7/1954 | Cass | 260—75 |
| 2,712,535 | 7/1955 | Fisch | 260—835 |
| 2,890,194 | 6/1959 | Phillips et al. | 260—835 |
| 2,891,034 | 6/1959 | Fisch | 260—835 |
| 2,962,469 | 11/1960 | Phillips et al. | 260—835 |
| 3,027,279 | 3/1962 | Kurka et al. | 117—232 |
| 3,278,636 | 10/1966 | Wynstra | 260—835 |
| 3,280,077 | 10/1966 | Case et al. | 260—75 |
| 3,360,543 | 12/1967 | Hoy | 260—475 |
| 3,397,254 | 8/1968 | Wynstra et al. | 260—835 |
| 3,427,255 | 2/1969 | Case | 252—426 |

OTHER REFERENCES

Lee & Neville, Handbook of Epoxy Resins, McGraw-Hill, New York 1967 (pp. 11–19 and 11–20 supplied).

MELVIN GOLDSTEIN, Primary Examiner

U.S. Cl. X.R.

260—40 R, 47 EA